Inventors:
Arvid E Anderson,
Herman Bany,
by Harry E. Dunham
Their Attorney.

Patented Aug. 15, 1939

2,169,863

UNITED STATES PATENT OFFICE 2,169,863

SYSTEM OF ELECTRIC DISTRIBUTION

Arvid E. Anderson, Drexel Hill, and Herman Bany, Lansdowne, Pa., assignors to General Electric Company, a corporation of New York Application May 7, 1938, Serial No. 206,624

11 Claims. (Cl. 171—97)

Our invention relates to systems of electric distribution and particularly to such systems in which a load circuit is supplied with current by a plurality of sources connected in parallel and more particularly to such a system in which the load circuit is supplied with current through a plurality of transforming means such as motor generators, rotary converters, and the like, connected in parallel between a common supply circuit and the load circuit. When such machines are connected in parallel, under light load conditions, it has been found that with the supply circuit intact if one of the machines is cold and another machine is hot the circulating currents between the machines may be of such a value relative to the load current that the power flow between the load circuit and the hot machine is reversed and the associated reverse power relay is operated to effect the disconnection of the hot machine from the load circuit.

One object of our invention is to provide an arrangement which prevents the disconnection of a transforming means from the load circuit under such conditions when the power reversal through the transforming means is due to the circulating current flowing between the parallel-connected transforming means but which will effect the disconnection of the transforming means when the power reversal through it is due to the failure of the common supply circuit.

In accordance with our invention, we provide an arrangement which permits a reversal of power through any of the parallel transforming means to effect the disconnection thereof from the load circuit only when the algebraic sum of the total power through all of the parallel-connected transforming means to the load circuit is less than a predetermined value.

Figure 1:
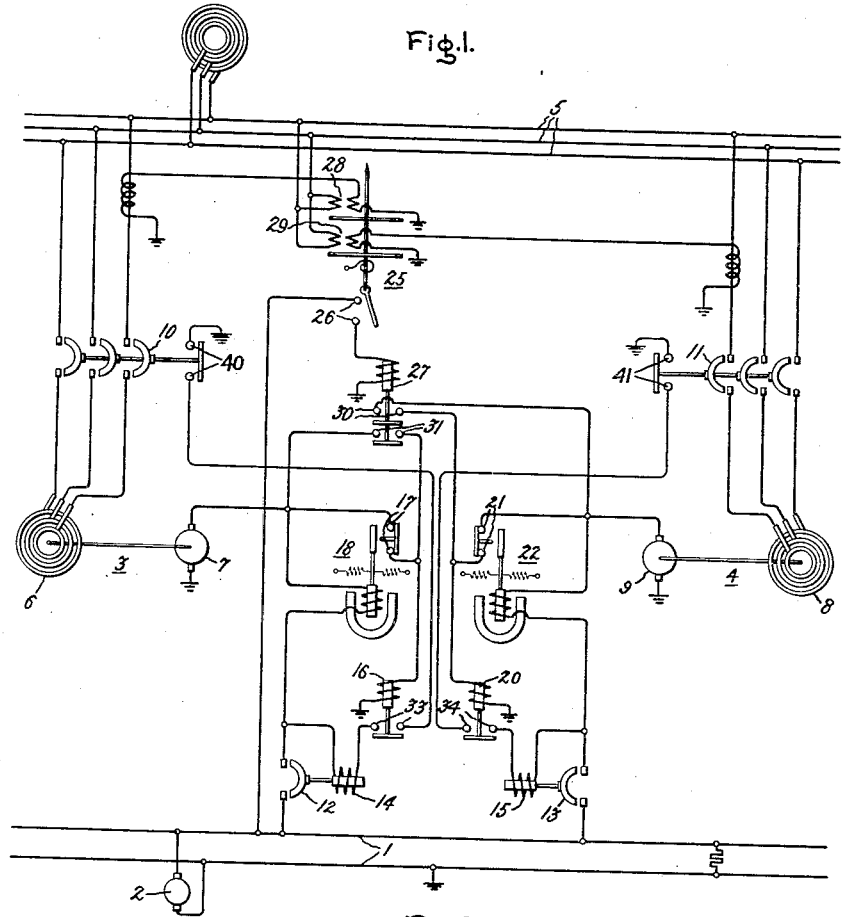
Figure 2:
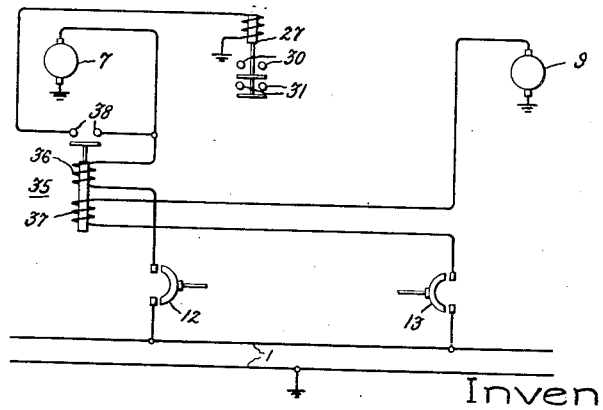

Our invention will be better understood from the following description when taken in connection with the accompanying drawing Fig. 1 of which illustrates a system of electric distribution embodying our invention and Fig. 2 of which is a modification of the arrangement disclosed in Fig. 1 and its scope will be pointed out in the appended claims.

Referring to Fig. 1 of the drawing, 1 represents a load circuit which is supplied with current by a source of current 2 and by two rotary transforming means 3 and 4 interconnected in parallel between a supply circuit 5 and the load circuit 1. As shown in the drawing, the rotary transforming means 3 consists of a motor 6 driving a generator 7 and the transforming means 4 consists of a motor 8 driving a generator 9. The motors 6 and 8 are respectively connected to the supply circuit 5 by suitable switching means 10 and 11 and the generators 7 and 9 are respectively connected to the load circuit 1 by suitable switching means 12 and 13. In order to simplify the disclosure, the switching means 10 and 11 are shown as hand-operated switches. The switching means 12 and 13 are shown as contactors having closing coils 14 and 15 respectively which, when energized, maintain the associated switches in their closed positions. The energizing circuit of the closing coil 14 of the switch 12 is controlled by a voltage relay 16 which is normally connected across the terminals of the associated generator 7 through the normally closed contacts 17 of a reverse power relay 18 which is connected in any suitable manner to the source 7 so that the relay operates to open its contacts 17 when power flows from the load circuit 1 to the generator 7. Similarly, the circuit of the closing coil 15 of the switch 13 is controlled by a voltage relay 20 which in turn is connected across the terminals of generator 9 by the normally closed contacts 21 of a reverse power relay 22 associated with the source 9.

In accordance with our invention, we provide means for preventing either of the reverse power relays 18 and 22 from effecting the disconnection of the associated sources of current from the load circuit 1 unless the algebraic sum of the total power flowing through the rotary transforming means 3 and 4 is less than a predetermined value. In the embodiment of our invention shown in Fig. 1, this result is accomplished by providing a wattmetric relay 25 which is connected in any suitable manner so that it is energized in accordance with the algebraic sum of the watts flowing between the supply circuits 5 and the motors 6 and 8 and which is arranged to maintain its contacts 26 in the energizing circuit of an associated control relay 27 closed as long as the total net power flow from the supply circuit 5 to the transforming means 3 and 4 is above a predetermined value. As shown in Fig. 1, relay 25 has two single phase wattmetric driving elements 28 and 29 which are respectively connected to the energizing circuits of the motors 6 and 8 so that each driving element exerts, in a direction to close the contacts 26, a force proportional to the watts in the associated motor circuit when power flows through the associated transforming means from the supply circuit 5 to the load circuit 1. The control relay 27, when energized, respectively completes through its contacts 30 and 31 shunt circuits around the contacts 21 and 17 of the relays 18 and 22 so that both of the contacts 17 and 31 have to be open simultaneously in order to effect the deenergization of the voltage relay 16 to effect the opening of the switch 12 and both of the contacts 21 and 30 have to be open simultaneously in order to effect the opening of the switch 13.

The operation of the arrangement shown in Fig. 1 is as follows: When both of the transforming means 3 and 4 are in operation, the switches 10 and 11 are closed so that the motors 6 and 8 are connected to the supply circuit 5 and both of the switches 12 and 13 are closed so that the generators 7 and 9 are connected to the load circuit 1. Under these conditions, the circuit of the closing coil 14 of the switch 12 is completed through the contacts 40 of switch 10 and the contacts 33 of the voltage relay 16 which in turn is connected across the terminals of the generator 7 through the contacts 17 of the reverse power relay 18. The circuit of the closing coil 15 of the switch 13 is completed through the contacts 41 of switch 11 and the contacts 34 of the voltage relay 20 the circuit of which is completed across the terminals of the generator 9 through the contacts 21 of the reverse power relay 22. As long as both generators continue to supply current in parallel to the load circuit 1, the algebraic sum of the power supplied thereto will be sufficient to cause the relay 25 to maintain its contacts 26 closed so that the energizing circuit of the associated control relay 27 is completed across the load circuit 1.

If, under light load conditions, the circulating current between the generators 7 and 9 is such, due for example to one of the generators being "cold" and the other being "hot", that the current through one of the generators reverses, the associated reverse power relay opens its contacts. Under these conditions, since the algebraic sum of the power flowing between the supply circuit 5 through the load circuit 1 is still in a direction to maintain the contacts 26 closed, the relay 27 still maintains its contacts 30 and 31 closed. Therefore, although the circulating current between the generators 7 and 9, under light load conditions may cause one of the reverse power relays 18 and 19 to open its reverse current contacts, the voltage relay associated with the source through which the reverse current flows is not deenergized as its circuit is still maintained through contacts of the relay 27. For example, if the current should reverse through the generator 9 under these light load conditions while the generator 7 is still supplying current to the load circuit 1, the opening of the contacts 21 of the reverse power relay 22 does not effect the deenergization of the voltage relay 20 and the opening of the switch 13, because the circuit of the voltage relay 20 is still completed through the contacts 30 of the relay 27. However, if the voltage of the supply circuit 5 should fail for any reason so that power flows from the load circuit 1 to the supply circuit 5 through both of the rotary transformers 3 and 4, the reverse power relays 18 and 22 respectively open the contacts 17 and 21. Also, since the flow of power is from the load circuit 1 to the supply circuit 5, the contacts 26 of the relay 25 are open so that the relay 27 is deenergized. Under these conditions, the relay 16 is deenergized since both of the parallel connected contacts 17 and 31 in its energizing circuit are open. Consequently, the relay 16 opens its contacts 33 and effects the deenergization of the closing coil 14 to open the switch 12 and disconnect the generator 7 from the load circuit 1. Similarly, the circuit of the voltage relay 20 is open at the parallel connected contacts 21 and 30 so that the closing coil 15 is deenergized to effect the opening of the switch 13 to disconnect the generator 9 from the load circuit 1.

Therefore, it will be seen that we have provided an arrangement whereby a power reversal through one of the generators due to circulating currents flowing between the parallel-connected generators does not effect the disconnection of the generator through which the reverse current flows, but when the reverse current is due to a failure of the supply circuit 5, the generator through which the reverse current flows is disconnected from the load circuit 1.

The modification of our invention shown in Fig. 2 is similar to the arrangement disclosed in Fig. 1 except that the wattmetric relay 25 is replaced by an under-current relay 35 which has two energizing windings 36 and 37 respectively connected in series with the generators 7 and 9. This relay is arranged so that as long as the sum of the currents flowing through the generators 7 and 9 exceeds a predetermined value, the relay contacts 38, which are connected in the energizing circuit of the control relay 27, remain closed. Therefore, as long as either source continues to supply current to the load circuit 1, the relay 35 maintains its contacts 38 closed. However, in case of a failure of the supply circuit 5 the relay 35 will open its contacts 38 and effect the deenergization of the control relay 27 so that when the reverse power relays 18 and 22 effect the opening of their respective contacts 17 and 21, the associated switches 12 and 13 disconnect the generators 7 and 9 from the load circuit 1.

While we have, in accordance with the patent statutes, shown and described our invention as applied to a particular system and as embodying various devices diagrammatically indicated, changes and modifications will be obvious to those skilled in the art, and we therefore aim in the appended claims to cover all such changes and modifications as fall within the true spirit and scope of our invention.

What we claim as new and desire to secure by Letters Patent in the United States is:

1. In combination, a load circuit, two sources of current connected to said circuit in parallel, means for disconnecting one of said sources from said load circuit and means responsive to a reversal of current through said one of said sources for effecting the operation of said disconnecting means only when the algebraic sum of the power flowing through said sources is below a predetermined value.

2. In combination, a load circuit, a plurality of sources of current connected to said circuit in parallel, means for disconnecting one of said sources from said load circuit and means dependent upon the algebraic sum of the power flowing through all of said sources being below a predetermined value and upon a reversal of power flow through one of said sources for effecting the operation of said disconnecting means.

3. In combination, a load circuit, two sources of current connected to said circuit in parallel, means for effecting the disconnection of each source in response to a reversal of current between it and said load circuit, and means for preventing the operation of said disconnection means when any of said sources is supplying current to said load circuit.

4. In combination, a load circuit, two sources of current connected to said circuit in parallel, means for effecting the disconnection of each source in response to a reversal of current between it and said load circuit, and means for preventing the operation of said disconnection means when the algebraic sum of the current flowing through said sources exceeds a predetermined amount.

5. In combination, a supply circuit, a load circuit, a plurality of transforming means interconnecting said supply circuit and said load circuit, means for effecting the disconnection of a transforming means from said load circuit when the power flow through the transforming means is from the load circuit to the transforming means, and means for preventing the disconnection of a transforming means from said load circuit when the algebraic sum of the power transferred through said plurality of transforming means is above a predetermined amount.

6. In combination, a supply circuit, a load circuit, a plurality of transforming means interconnecting said supply circuit and said load circuit, and means for effecting the disconnection of a transforming means from said load circuit in response to a reverse of power through the transforming means due to a failure of said supply circuit and for preventing the disconnection of a transforming means from said load circuit when a reversal of current occurs through the transforming means due to the circulating current flowing between said transforming means.

7. In combination, a supply circuit, a load circuit, a plurality of rotary transformers interconnecting said circuits, directional means individual to each transformer and responsive to the direction of power flow through the associated transformer, means responsive to the algebraic sum of the power flowing between said circuits, means controlled by each directional means for effecting the disconnection of the associated transformer from said load circuit when the direction of power flow through the associated transformer is reversed, and means controlled by said power flow responsive means for preventing any of the directional means from effecting the disconnection of its associated transformer when the algebraic sum of the power flow is above a predetermined value.

8. In combination, a supply circuit, a load circuit, a plurality of rotary transformers interconnecting said circuits, and means for effecting the disconnection of a rotary transformer from said load circuit in response to the flow of power through the rotary transformer only when the algebraic sum of the power flowing between said supply circuit and said rotary transformers is also less than a predetermined amount.

9. In combination, a supply circuit, a load circuit, a plurality of rotary transformers interconnecting said circuits, and means for effecting the disconnection of a rotary transformer from said load circuit in response to the flow of power through the rotary transformer only when the algebraic sum of the power flowing between said rotary transformer and said load circuit is also less than a predetermined amount.

10. In combination, an alternating current supply circuit, a direct current load circuit, a plurality of motor generator sets interconnecting said circuits, directional means individual to each set and responsive to the direction of current flow between the associated generator and the load circuit, means responsive to the algebraic sum of the power flowing between said supply circuit and the motors of said sets, and means controlled by said directional means and said power responsive means for effecting the disconnection of a set from said circuits in response to a reversal of power therethrough if the algebraic sum of the power flowing between said supply circuit and the motors of said sets is also less than a predetermined amount.

11. In combination, an alternating current supply circuit, a direct current load circuit, a plurality of motor generator sets interconnecting said circuits, directional means individual to each set and responsive to the direction of current flow between the associated generator and the load circuit, means responsive to the algebraic sum of the current flowing between the generators of said sets and said load circuit and means controlled by said directional means and said other current responsive means for effecting the disconnection of a set from said circuits in response to a reversal of current therein if the algebraic sum of the current flowing between the generators and the load circuit is also less than a predetermined amount.

ARVID E. ANDERSON.
HERMAN BANY.